United States Patent Office.

HENRY HERBERT LLOYD, OF GERMANTOWN, PENNSYLVANIA, ASSIGNOR TO ELECTRIC STORAGE BATTERY COMPANY, OF PHILADELPHIA, PENNSYLVANIA, A CORPORATION OF NEW JERSEY.

NON-ACTIVE METAL FOR USE IN STORAGE BATTERIES.

SPECIFICATION forming part of Letters Patent No. 713,568, dated November 11, 1902.

Application filed June 29, 1900. Serial No. 22,024. (No specimens.)

*To all whom it may concern:*

Be it known that I, HENRY HERBERT LLOYD, a subject of Her Majesty the Queen of Great Britain, residing at Germantown, in the county of Philadelphia and State of Pennsylvania, have invented a certain new and useful Non-Active Metal for Use in and in Connection with Storage Batteries, of which the following is a specification.

One object of the present invention is to provide a metal characterized by toughness, smoothness, resiliency, and great strength in proportion to weight and adapted to resist when applied in connection with storage batteries the action of such acids as are usually employed even when accentuated by electrolysis.

To this and other ends hereinafter set forth the invention, stated in general terms, comprises non-active metal consisting of rolled antimonious lead.

The non-active metal may be used as a lining for the tanks or even as a material from which to construct the tanks in which the plates are mounted and in which the normal action of the battery takes place, or, in other words, it may be used to make a holder for the electrolyte. The same properties or qualities, or some of them, which especially adapt it for these uses also adapt it for use as material from which to make the supporting grid or holder for the active material or material to become active of the plates. The non-active metal may be made by melting lead and antimony, of which latter there may be present from five to fifteen per cent., by weight, more or less, (in actual practice excellent results have been obtained in the use of substantially twelve per cent., by weight, of antimony,) and then casting the alloy. This has been done before, but the resulting metal when placed in the electrolyte of a storage battery corroded. Moreover, it was brittle, not flexible nor resilient, and was comparatively heavy in proportion to its mechanical strength, so that it could not be obtained or used in the form of sheets of that degree of thinness which is desirable for the support of many types of plates and also for the linings of many types of receptacles. However, according to this invention the antimonious lead which has been cast is then subjected to repeated cold-rolling or equivalent forging, and the result upon it of the rolling is to materially change its characteristics and to make it useful for storage batteries in a way that it was never useful before, and, further, to make possible the production of types of batteries characterized by lightness, durability, and strength, which could not heretofore be made. For example, extremely light plates could not be made on cast antimonious-lead supports because of the weight of the latter necessary for sufficient mechanical strength. Consequently such plates were made on pure-lead supports, which were corroded or formed, more especially near the terminals, which thus were detached. However, by the use of rolled antimonious-lead supports such light plates can now be satisfactorily made. The effect of the rolling upon the cast antimonious lead is to entirely change its character, to remove it from the class of brittle metals, and to transfer it to the class of metals of which sheets of hard rolled copper are a good example—that is to say, the rolling replaces brittleness by elasticity combined with stiffness. It replaces small mechanical strength and great weight by great mechanical strength for little weight, and it resists tendency to corrosion when in use. The term "non-active metal" is used to describe a metal which when subjected to the action that takes place in a storage-battery cell is not materially affected thereby, in contradistinction to metals which under like circumstances undergo changes which are referred to as "conversion into active material." As a holder for the electrolyte it possesses the mechanical strength which is lacking in pure lead, and it also resists the action of the acid better than pure lead would do and better than cast antimonious lead would do, and it is much lighter than either for the same strength.

Having thus described the invention, what I claim as new, and desire to secure by Letters Patent, is—

1. A non-active metal for use in and in connection with storage batteries and having the qualities of toughness, smoothness, resiliency, and great mechanical strength in proportion to its weight, said metal comprising lead cast with substantially twelve per cent. by weight of antimony and rolled in a cold state, as specified.

2. Lining metal composed of cast antimonious lead rolled in a cold state, as specified.

In testimony whereof I have hereunto signed my name.

HENRY HERBERT LLOYD.

In presence of—
K. M. GILLIGAN,
W. J. JACKSON.